May 3, 1927.
M. J. OWENS
BOTTLE TRANSFER MECHANISM
Filed Sept. 20, 1924     5 Sheets-Sheet 3
1,626,748
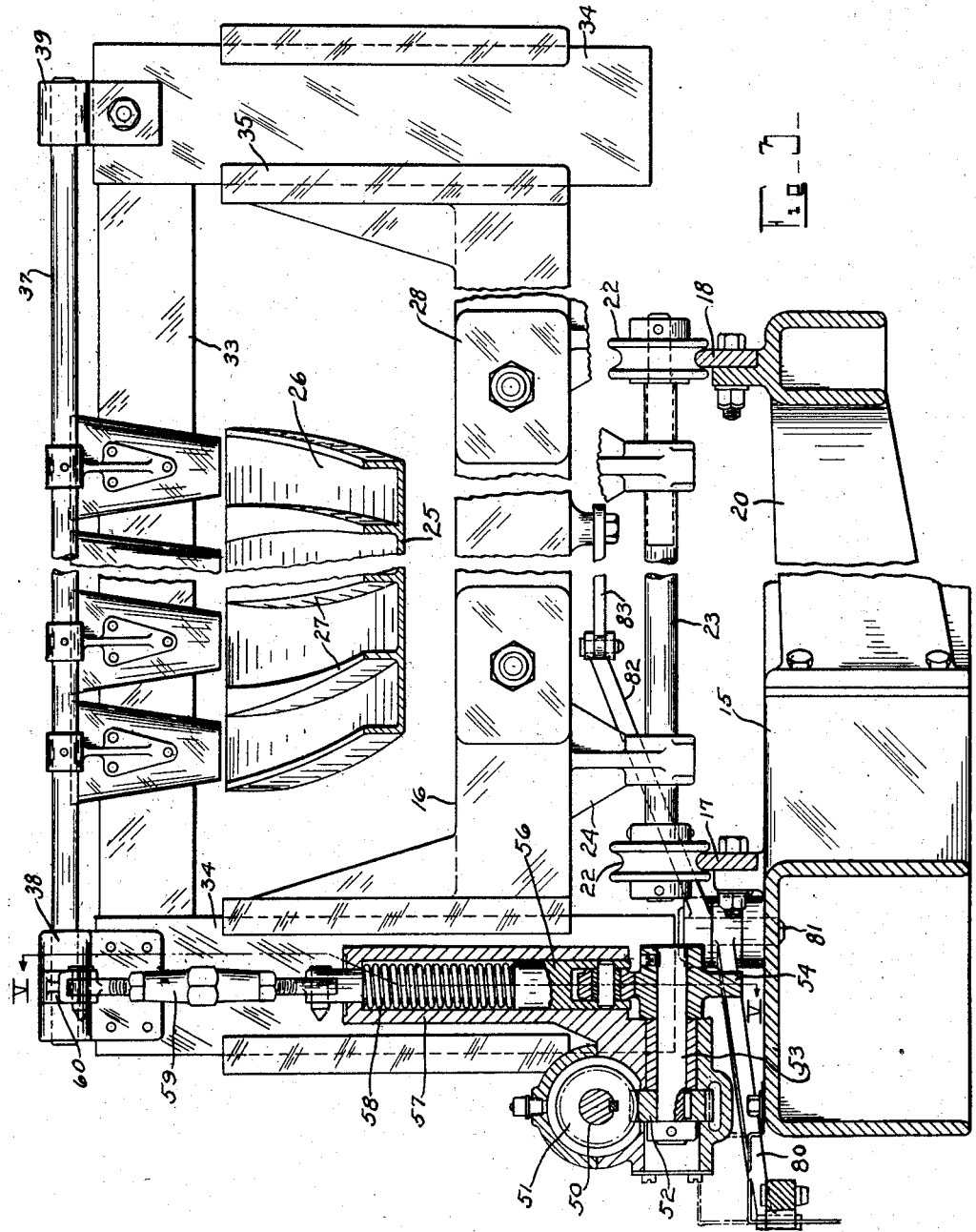
INVENTOR
M. J. Owens
BY J. F. Rule
HIS ATTORNEY

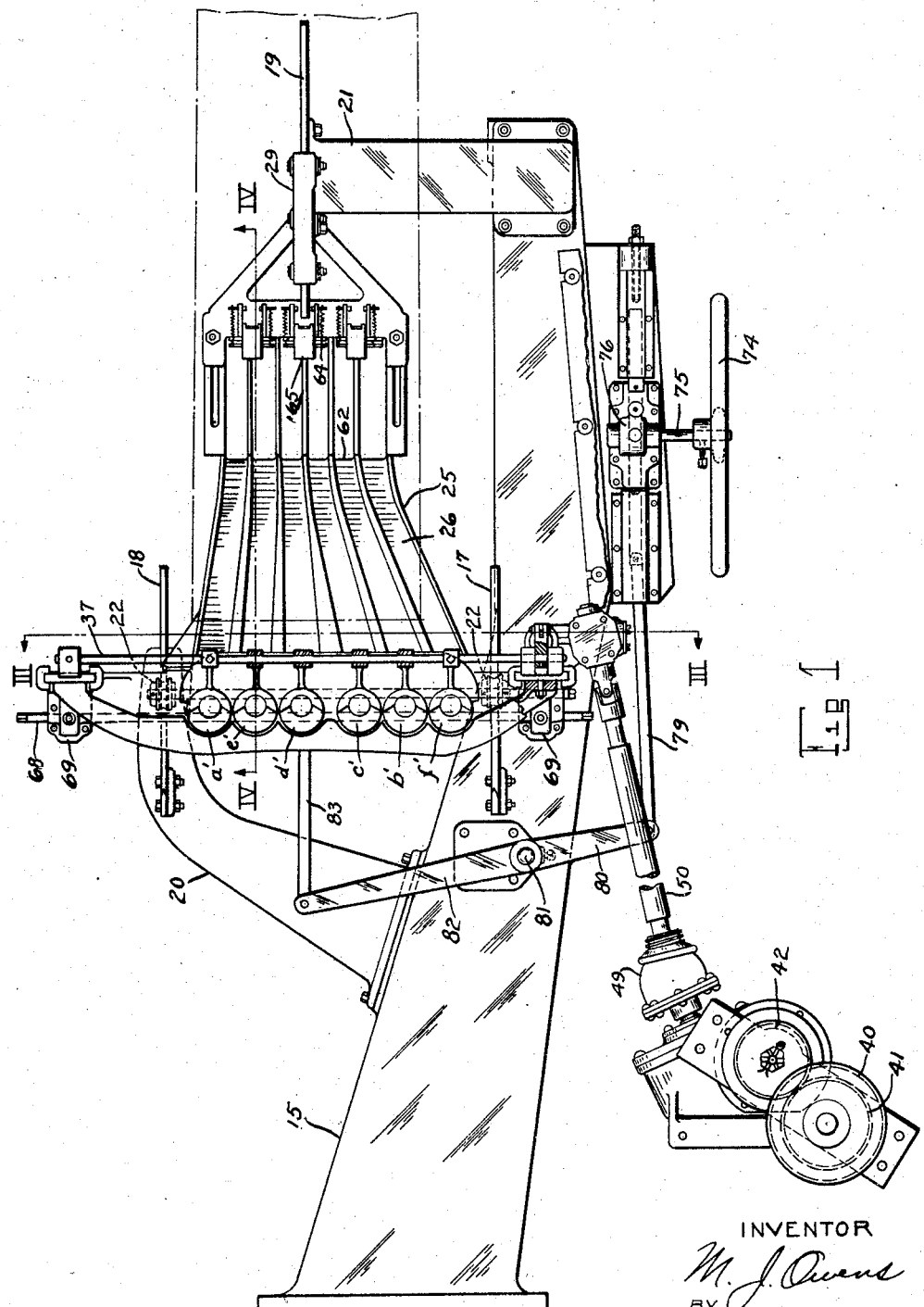

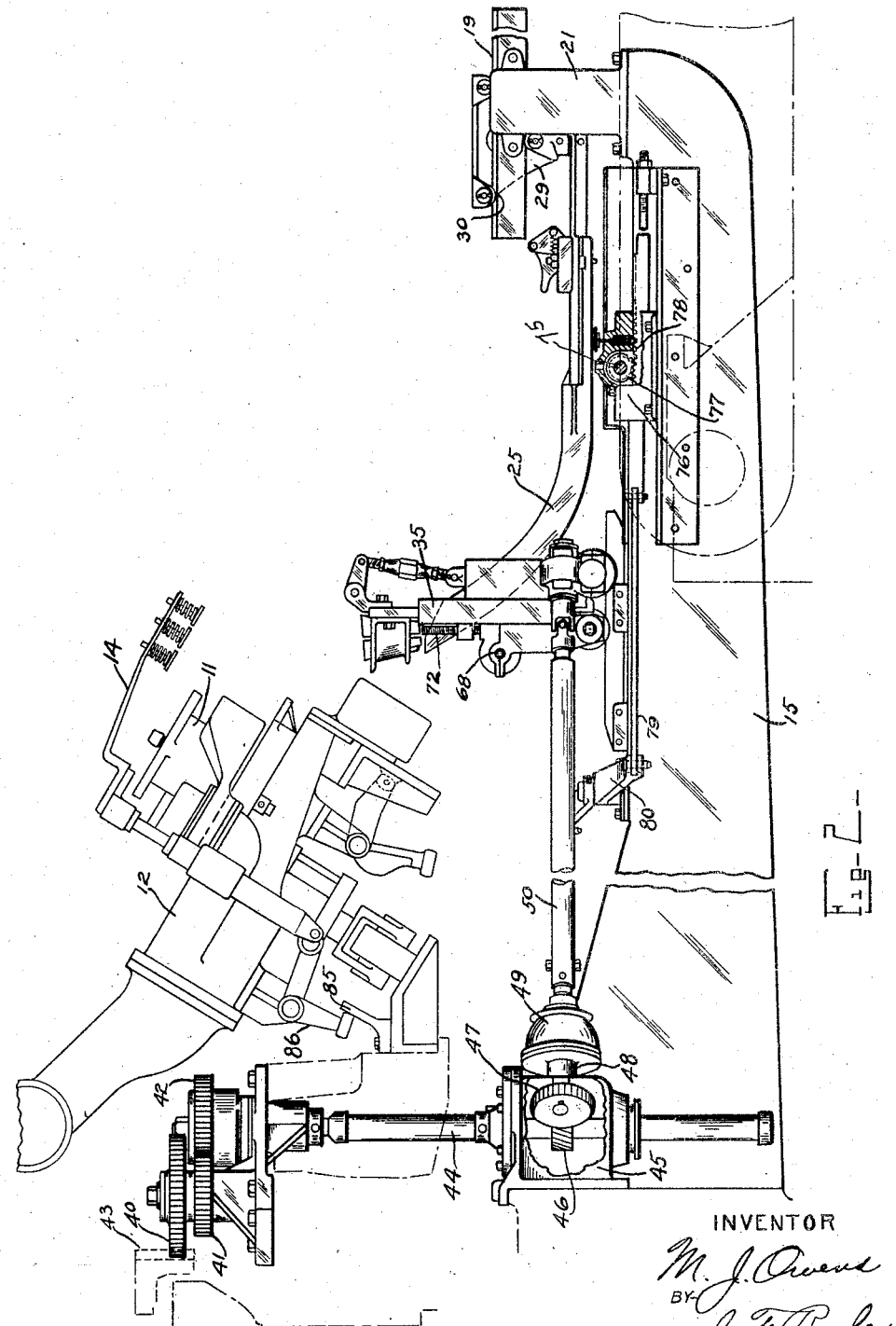

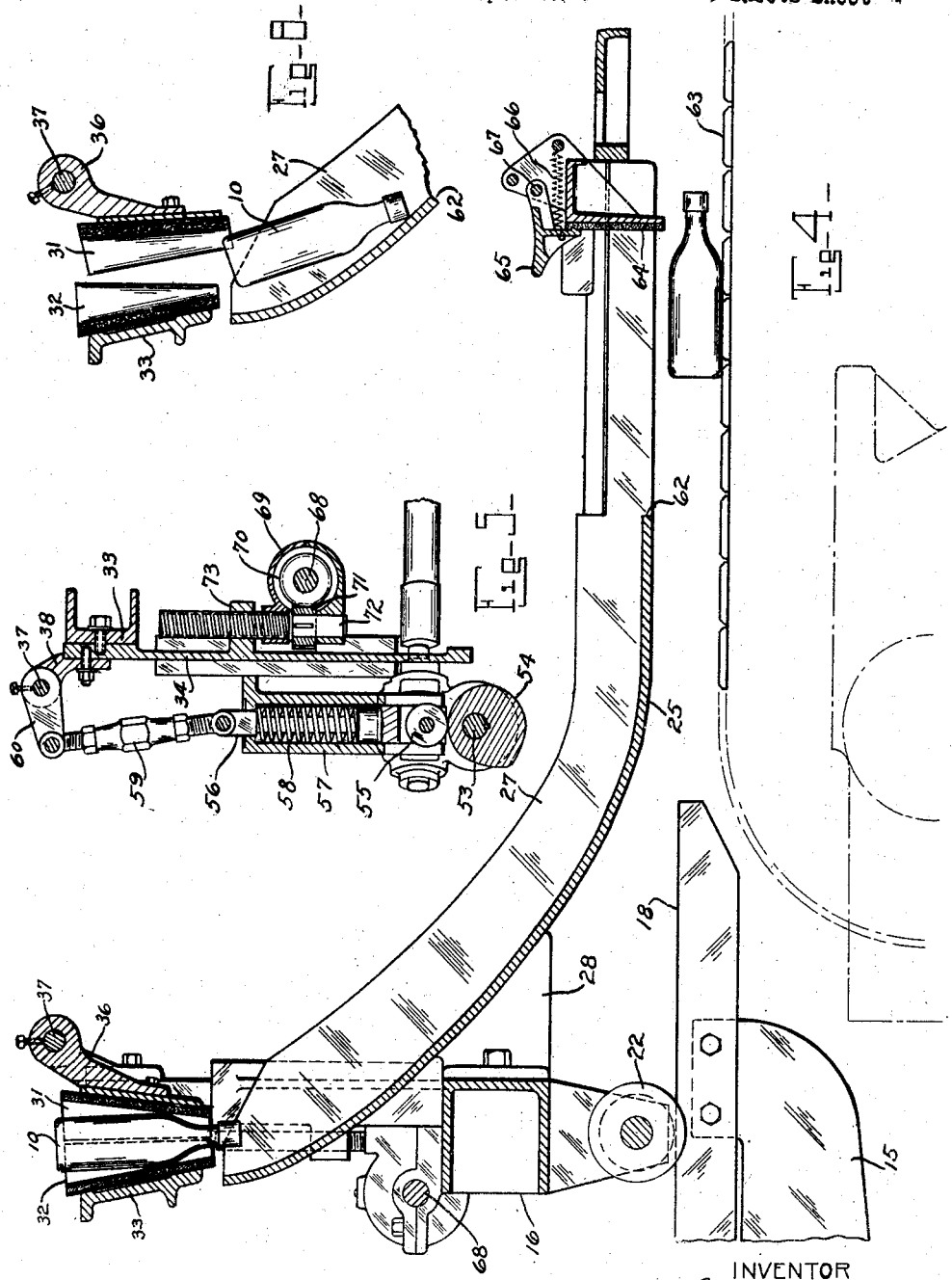

May 3, 1927.   1,626,748
M. J. OWENS
BOTTLE TRANSFER MECHANISM
Filed Sept. 20, 1924   5 Sheets-Sheet 5
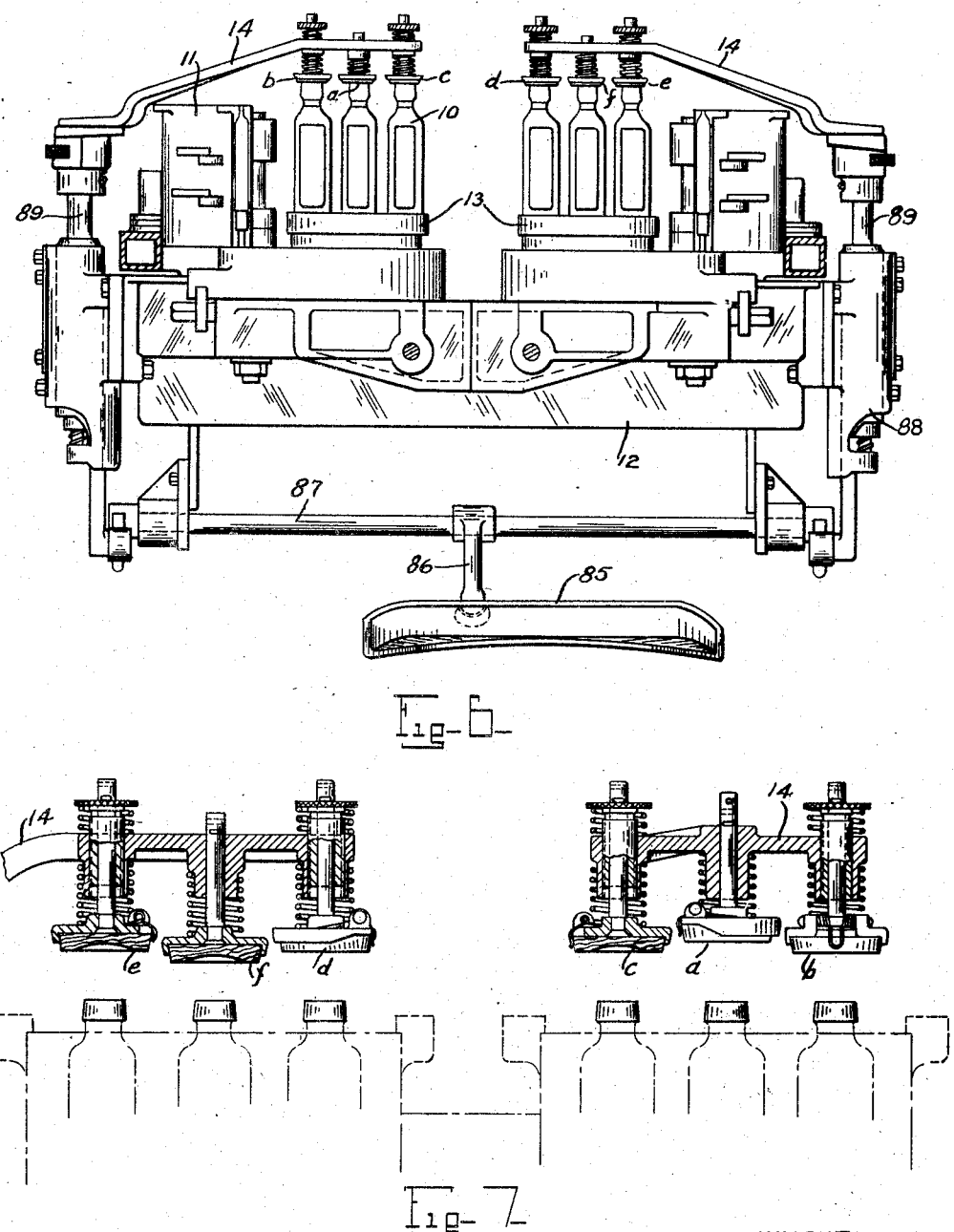
INVENTOR
M. J. Owens
BY
J. F. Rule
HIS ATTORNEY Patented May 3, 1927.

1,626,748

UNITED STATES PATENT OFFICE.

MICHAEL J. OWENS, DECEASED, LATE OF TOLEDO, OHIO; BY HAZEL O. BEESCH, JAMES C. BLAIR, AND JOHN H. McNERNEY, ADMINISTRATORS, OF TOLEDO, OHIO, ASSIGNORS TO THE OWENS BOTTLE COMPANY, OF TOLEDO, OHIO, A CORPORATION OF OHIO.

BOTTLE-TRANSFER MECHANISM.

Application filed September 20, 1924. Serial No. 738,777.

The present invention relates to apparatus for receiving bottles or other articles as they are delivered from a forming machine and transferring them to a conveyor or other support. The invention is particularly designed for use with a glass forming machine which delivers a plurality of such articles simultaneously or at about the same time.

An object of the invention is to provide an apparatus of the character indicated, which will handle the articles in a manner to prevent marring or distortion while they are still soft and plastic, and which will keep them temporarily out of contact with each other and thereby prevent them from sticking together.

Other objects of the invention will appear hereinafter.

In the accompanying drawings:

Figure 1 is a plan view of an apparatus embodying the principles of the present invention.

Figure 2 is a side elevation of the same, and also shows a portion of the glass forming machine.

Figure 3 is a sectional elevation on a larger scale with a portion of the mechanism broken away, the section being taken at the line III—III on Figure 1.

Figure 4 is a sectional elevation at the line IV—IV on Figure 1.

Figure 5 is a sectional elevation at the line V—V on Figure 3.

Figure 6 is a front elevation of that portion of the bottle blowing machine shown in Figure 2.

Figure 7 is a detail view of the "knock-out" arms and heads which control the discharge of the bottles from the blowing machine.

Figure 8 is a fragmentary view showing one of the bottle holders or clappers in open position.

The bottles 10 or other glass articles are discharged from the finishing molds 11 (Figs. 2 and 6) of a glass forming machine. In the type of machine herein shown, there are two finishing molds 11 mounted on the mold carrying frame 12, each of said molds being formed with a plurality of mold cavities,—in the present instance, three. The machine comprises an annular series of these mold carrying frames 12, connected to a continuously rotating mold carriage, whereby the molds are brought in pairs to a discharging position. As a frame 12 reaches discharging position, the molds 11 thereon are opened, leaving the bottles 10 temporarily supported on the mold bottoms 13. The discharge of the bottles from the machine is controlled by a pair of knock-out arms 14 carrying knock-out disks $a, b, c, d, e$ and $f$, which engage the upper ends of the bottles. When the discharging position is reached, the arms 14 are lifted and swung apart, thereby permitting the bottles to drop from the machine, as hereinafter set forth.

The apparatus for receiving the bottles is supported by a horizontally disposed arm or bracket 15 secured to and projecting outwardly from the base of the bottle blowing machine, and is adjustable horizontally toward and from the machine, being mounted for such adjustment on three tracks 17, 18 and 19. The track 17 is mounted on the arm 15. The track 18 is carried on a bracket 20 bolted to the arm 15. The track 19 is secured to a bracket 21 on the forward end of the arm 15. Rolls 22 run on the rails 17 and 18, said rolls being carried on a shaft 23 (Fig. 3) mounted in hangers 24 on the under side of a frame 16.

A multiple chute 25 which in the particular construction shown is cast in a single piece, comprises a plurality of troughs or guideways 26 separated by partition walls 27 rising from the floor of the chute. The chute 25 is attached at its rear end by means of brackets 28 (Figs. 3 and 4) to the frame 16. The forward end of the chute is supported from the rail 19 by means of a bracket 29 rising from the chute and overhanging said rail and having rolls 30 running on the rail.

The bottles as they are discharged from the finishing molds are dropped into funnel shaped guides or clappers which arrest the bottles and serve as temporary holders. Each holder comprises a swinging section 31 and a relatively stationary section 32. Said guides are supported on a frame comprising a horizontal member 33 and vertical end members 34. Said frame 33, 34 is supported in the frame 16 and is adjustable up and down thereon, as hereinafter described, the frame members 34 being supported and guided in vertical guideways 35 formed on the frame 16.

The sections 32 of the funnel guides may be supported directly on the frame member 33. The sections 31 are carried on arms 36 keyed to a horizontal rock shaft 37, the latter journalled in bearing brackets 38 and 39 on the frame 33, 34. The shaft 37 is periodically rocked to release the bottles which have been dropped into the funnel guides and permit them to slide down the chute. The mechanism for rocking the shaft 37 will now be described.

Referring to Figures 1 and 2, a train of gears 40, 41 and 42 is driven from an annular gear 43 on the continuously rotating mold carriage of the bottle blowing machine. The gear 42 is carried on the upper end of a vertical shaft 44 extending downward through a gear box 45. Within said gear box are intermeshing gears 46 and 47 carried respectively on the shaft 44 and a shaft 48, the latter having a universal joint connection 49 with a horizontally disposed shaft 50. The shaft 50 comprises telescoping sections to permit adjustment of the frame 16 toward and from the blowing machine. The shaft 50 at its forward end carries a gear 51 (see Fig. 3) which runs in mesh with a gear 52 keyed to a horizontal shaft 53, to which is also keyed a cam 54 (see also Fig. 5). The cam engages a roll 55 journalled in the lower end of a rod 56 movable up and down in a housing 57. A coil spring 58 within said housing bears downward on said rod and holds the roll 55 against the cam. An adjustable link comprising a turn buckle 59 connects the rod 56 with a rock arm 60 keyed to the rock shaft 37.

It will be seen that by means of the gearing just described, the shaft 37 is periodically rocked to swing the funnel members 31 from holding position (Fig. 4) to open position (Fig. 8), thereby permitting the bottles to drop. This movement of the rock shaft is synchronized with the bottle discharging movements of the blowing machine. That is to say, the guides 31, 32, are opened once for each group of bottles delivered thereto. When the bottles are dropped from the molds, as hereinafter described, the funnel guides are in the Figure 4 position and arrest the bottles. After all the bottles of a group have been dropped into these guides, the cam 54 operates to separate the sections 31, 32 and simultaneously release all the bottles of the group. When a group of bottles is released, they slide by gravity down the chute, being held out of contact with each other by the spacing walls 27. The floor of the chute only extends to the point 62 and as the bottles are carried by their momentum beyond this point, they drop on a continuously traveling belt conveyor 63, by which they may be carried into the leer.

At the forward end of the chute there is provided means for arresting the bottles, comprising pads 64 which stop the forward movement of the bottles until they have dropped onto the conveyor. The pads 64 may be made of asbestos and are removably held in place by latches 65 held against the pads by springs 66. By swinging a latch 65 upward about its pivot 67, the pad 64 may be quickly removed and replaced by a new pad. As shown in Figure 1, each of the pads 64 extends across two of the passages 26.

The frame 33, 34 is adjustable up and down on the frame 16 to adjust the funnel guides with relation to the finishing molds. The means for effecting this adjustment comprises a shaft 68 (Figs. 1, 4 and 5) having bearings in the frame 16 and extending transversely thereof. Mounted on said shaft, within gear cases 69, are gears 70 (Fig. 5) which run in mesh with gears 71 keyed to vertical screw threaded rods 72 extending through correspondingly threaded bearing lugs 73 on the frame members 34. The end of the shaft 68 may be squared to receive a crank for turning said shaft and thereby adjusting the frame 33, 34 up and down. The turn buckle 59 permits adjustment of the rod 56 to correspond to the vertical adjustment of the frame 33, 34, and also permits separate adjustment of the guide members 31.

The frame 16 is adjustable horizontally toward and from the blowing machine to properly position the funnel guides with respect to the molds. This adjustment (see Figs. 1 and 2) is effected by a hand wheel 74 on a shaft 75 mounted in a bearing 76 carried on the arm 15. Keyed to said shaft is a pinion 77 which runs in mesh with a rack 78 slidably mounted in the bearing block 76. The rack bar 78 is connected through a link 79 to a lever arm 80 keyed to a fulcrum pin 81 (see also Fig. 3) to which is also secured a lever arm 82 connected through a link 83 to the frame 16. By rotating the hand wheel 74, motion is transmitted through the lever 80, 82 and thus moves the frame carrying the funnel guides and chutes, forward or rearward.

Referring to Figure 7, it will be noted that the disks carried on the arms 14 are adjusted so that they assume different levels when lifted off the bottles. The disk $a$ is adjusted to the highest position so that when the arm 14 carrying said disk is lifted, the disk $a$ will be lifted from its bottle before the disks $b$ and $c$. The disks $b$, $c$, $d$ and $e$ are at the same level so that they will all release their bottles simultaneously, assuming that the two arms 14 are lifted simultaneously. The disk $f$ which is in the lowest position will be the last to release its bottle. With this arrangement, the six bottles forming a group are not all discharged simultaneously, but at three different periods in quick succession. The operation of the arms 14 may be so timed that the disk $a$ is lifted when the corresponding bottle is opposite the first funnel guide—that is, the guide at the position $a'$ (Fig. 1). When the mold carriage has been advanced to a position in which the holders $b$, $c$, $d$ and $e$ are opposite the guides $b'$, $c'$, $d'$ and $e'$ respectively, the arms 14 are lifted another step to release the four bottles held by said heads, permitting the bottles to drop into the corresponding holders. As the mold carriage continues to rotate, the head $f$ is brought opposite the mold $f'$ and the arm 14 carrying said head moves upward to release the corresponding bottle and permit it to drop into the holder $f'$.

It has been found in practice that under certain operating conditions, particularly where there is a considerable number of bottles in each group, they can be discharged into the holders with more certainty and accuracy when the knock-out arms are arranged to release only a part of the bottles of a group at one time, in the manner just described, rather than releasing all the bottles of a group simultaneously. It will also be noted that in the operation just described, no two adjacent bottles in either mold are released simultaneously. The arrangement permits a wider spacing of the funnel guides than would otherwise be possible. The order in which the knock-out disks are lifted for releasing the bottles may readily be varied by adjustment of said disks in their holding arms, the particular arrangement shown and described being merely an example of an arrangement which has proved satisfactory in practice.

The means for actuating the knock-out arms 14 comprises a stationary cam 85 which operates through a rock arm 86 and rock shaft 87, the latter operating through intermediate mechanism 88 to impart vertical and rocking movements to shafts 89 which carry the arms 14. The specific form of mechanism for operating the arms 14 may be the same as is ordinarily used in this type of machine.

Modifications may be resorted to within the spirit and scope of my invention.

What I claim is:

1. The combination of a glass forming machine comprising automatic means for periodically discharging bottles neck end downward in groups, means for receiving said bottles comprising holders individual to the bottles and arranged to receive them as they are discharged from said machine and hold them in spaced relation, and means to actuate said holders and simultaneously release all the bottles of a group therefrom.

2. The combination of a glass forming machine comprising automatic means for periodically discharging bottles neck end downward in groups, means for receiving said bottles comprising holders individual to the bottles and arranged to receive them as they are discharged from said machine and hold them in spaced relation, and automatic means controlled by said machine for actuating the holders to release the bottles therefrom.

3. The combination of a glass forming machine comprising automatic means for periodically discharging bottles neck end downward in groups, means for receiving said bottles comprising holders individual to the bottles and arranged to receive them as they are discharged from said machine and hold them in spaced relation, and automatic means operating in synchronism with the movements of the machine to periodically actuate said holders and thereby release the groups of bottles therefrom.

4. The combination of a glass forming machine comprising travelling plural molds operable to deliver articles in groups during the travel of the molds, means for receiving said articles comprising a row of holders individual to the articles and arranged to receive them as they are discharged from said machine, means to actuate said holders and simultaneously release all the articles of a group therefrom and cause them to drop from the holders, and a multiple chute beneath said holders in position for receiving the articles as they are released from the holders and by which the articles are conveyed from the holders, said chute comprising partition walls to keep the articles out of contact with each other, said walls dividing the chute into individual troughs in register respectively with the individual holders.

5. The combination of a glass forming machine comprising automatic means for periodically discharging articles neck end downward in groups, means for receiving said articles comprising holders individual to the articles and arranged to receive them as they are discharged from said machine, means to actuate said holders and simultaneously release all the articles of a group therefrom and cause them to drop from the holders, an inclined support beneath the holders to receive the articles as they are released from the holders and down which the articles slide by gravity, and means to separate said support into individual troughs to hold the articles out of contact with each other as they move down said support.

6. The combination of a glass forming machine operable to deliver articles in groups with the articles spaced apart, means for receiving said articles comprising holders individual to the articles and arranged to receive them as they are discharged from said machine and maintain them in spaced relation, means to actuate said holders and simultaneously release all the articles of a group therefrom, an inclined chute beneath the holders to receive the articles, said chute comprising guideways individual to the holders, whereby the articles are kept out of contact with each other during their passage down the chute, and a conveyor positioned to receive the articles from the chute.

7. The combination of a plurality of funnel shaped holders arranged in a row, each holder comprising separable sections, a rock shaft, rock arms thereon, each carrying a section of one of said holders, and means for rocking said shaft and thereby actuating the holders to separate said sections and thereby release articles held between the said sections.

8. The combination of a bottle forming machine comprising molds in which the bottles are formed and from which they are discharged in groups, individual holding devices for the bottles, means to actuate said devices to release the bottles and cause them to drop neck end downward from the machine, a series of stationary funnel shaped holders individual to the bottles, positioned to receive them neck end first as they are dropped from the machine and temporarily hold them, each of said holders comprising separable sections, a rock shaft, arms thereon, each carrying one section of a holder, and gearing between the bottle forming machine and said rock shaft comprising means for periodically rocking the shaft and thereby actuating the holders to release the bottles therefrom.

9. The combination of a bottle forming machine comprising means for discharging the bottles in groups, said bottles being dropped neck end downward from the machine, a series of stationary funnel shaped holders individual to the bottles, positioned to receive them neck end first as they are dropped from the machine and temporarily hold them, each of said holders comprising separable sections, a rock shaft, arms thereon, each carrying one section of a holder, gearing between the bottle forming machine and said rock shaft comprising means for periodically rocking the shaft and thereby actuating the holders to release the bottles therefrom, an inclined chute having its upper end directly beneath and in close proximity to the holders to receive the bottles as they are released from the holders, and partitions separating said chute into individual troughs or guideways along in register respectively with the individual holders and which guideways the bottles move by gravity and by which the bottles are kept out of contact with each other.

10. The combination of a glass forming machine constructed and arranged to deliver articles in groups, a stationary frame, a series of holders thereon individual to the articles of a group and arranged to receive said articles as they are discharged from the machine, and means for adjusting said frame toward and from the machine.

11. The combination of a glass forming machine constructed and arranged to deliver articles in groups, a stationary frame, a series of holders thereon individual to the articles of a group and arranged to receive said articles as they are discharged from the machine, and means for adjusting the holders vertically.

12. The combination with a glass forming machine comprising means to deliver a group of articles at a discharging station in a plurality of successive steps, of article receiving apparatus comprising a plurality of holders individual to the articles of said group and arranged to receive the articles as they are delivered from the machine, and means for simultaneously releasing all the articles from said holders.

13. The combination with a glass forming machine comprising a continuously rotating mold carriage, groups of molds thereon each constructed to deliver a group of articles at a discharging station in a plurality of successive steps while the mold group is passing said station, of article receiving apparatus comprising a plurality of stationary holders individual to the articles of said group and arranged to receive the articles as they are delivered from the machine, means for simultaneously releasing all the articles from said holders, and a multiple chute to receive the articles from the holders comprising means to keep the articles separated in their passage along the chute.

Signed at Toledo, in the county of Lucas and State of Ohio, this 13th day of September, 1924.

HAZEL O. BEESCH,
JAMES C. BLAIR,
JOHN H. McNERNEY,
*Administrators of the Estate of Michael J. Owens, Deceased.*